July 6, 1971   R. W. J. KLUCKOW ET AL   3,591,346
METHOD OF MANUFACTURING CRYSTALS AND CRYSTALS
MANUFACTURED BY SUCH METHODS
Original Filed March 1, 1966   3 Sheets-Sheet 1

INVENTORS
RUDOLF W. J. KLUCKOW
HEINZ SCHOLZ
BY
Frank R. Trifari
AGENT

July 6, 1971   R. W. J. KLUCKOW ETAL   3,591,346
METHOD OF MANUFACTURING CRYSTALS AND CRYSTALS
MANUFACTURED BY SUCH METHODS
Original Filed March 1, 1966   3 Sheets-Sheet 2

INVENTORS
RUDOLF W.J.KLUCKOW
HEINZ SCHOLZ
BY
AGENT

INVENTORS
RUDOLF W.J. KLUCKOW
HEINZ SCHOLZ

BY
Frank R. Trifari
AGENT

United States Patent Office 3,591,346
Patented July 6, 1971

3,591,346
METHOD OF MANUFACTURING CRYSTALS AND CRYSTALS MANUFACTURED BY SUCH METHODS
Rudolf Wilhelm Julius Kluckow, Eilendorf, and Heinz Scholz, Aachen, Germany, assignors to U.S. Philips Corporation, New York, N.Y.
Continuation of abandoned application Ser. No. 530,970, Mar. 1, 1966. This application Aug. 6, 1968, Ser. No. 754,130
Claims priority, application Netherlands, Mar. 3, 1965, 6502654
Int. Cl. B01d 7/00
U.S. Cl. 23—294                        10 Claims

ABSTRACT OF THE DISCLOSURE

Large crystals are formed from a fluid containing crystal forming material by periodically depositing crystalline material from the fluid and transferring part of the deposited material back into the fluid and away from the area of deposition, the amount of crystal material deposited in the deposition part of the cycle being greater than the amount of crystal material transferred to the fluid during each period. By this means the growth of large crystals is increased at the expense of the growth and formation of small crystals.

---

This application is a continuation of Ser. No. 530,970, now abandoned. This invention relates to methods of manufacturing crystals in a vessel by local deposition of the crystal material from a fluid contained in the vessel. The fluid may be, for example, vapour of the crystal material or its constituents, possibly mixed with a carrier gas, a solution of the crystal material in a liquid or a supercritical gas, or decomposable compounds of the crystal material or its constituents, for example, in the gaseous or vapour phase, possible mixed with a carrier gas, or dissolved in a liquid or a supercritical gas. A problem involved in such methods of obtaining crystals of reasonable dimensions is to permit growth of only one or a small number of crystals or crystal nuclei and to inhibit the production or growth of other crystal nuclei or crystallites in order to obtain only one crystal or a few relatively separated crystal bodies. Thus, for example, for forming single crystals by sublimation it has been suggested to use a sealed tube containing the initial material at one end and having its other end tapered. This tube was slowly passed, with its tapered end in front, through a tubular oven in which a maximum temperature locally prevails. Thus the tapered end was initially at a temperature higher than that of the initial material so that any particles of material present therein sublimated away, whereafter the temperature drop was progressively reversed and a single crystal grew from a crystal nucleus formed in the peak. However, in this case there is a possibility that more crystal nuclei are formed at the tapered end, resulting in the formation of polycrystalline material. It has also been suggested rapidly to form dendrite-like crystals at one end in a sealed tube by sublimation by means of a strong temperature gradient and, subsequently, to make the dendrites progressively grow in width by decreasing the temperature gradient. In this case also it is difficult to obtain relatively separated crystals.

The present invention, which inter alia has for its object to provide a method which does not have these disadvantages, underlies recognition of the fact that if, in such processes of deposition, the deposited material intermittently passes again to the fluid, smaller crystal particles can disappear and larger crystal particles can grow. According to the invention a method of the kind mentioned in the preamble is characterized in that the crystal material is periodically deposited and partly transferred again to the fluid, the material transferred to the fluid being removed from the area of deposition, whilst during each period of deposition and transfer to the fluid, a net amount of crystal material is deposited at the area of deposition. It is found that in the presence of larger crystals smaller crystals grow more difficultly and even decrease in that part of the period in which material passes from the deposition area to the fluid, to a greater extent than they increase in the part of the period in which deposition takes place, so that they disappear after a few periods. If, during deposition, new crystal nuclei may be formed adjacent to crystals already produced, these crystal nuclei disappear during the subsequent delivery of material to the fluid.

In one preferred embodiment the material transferred from the area of deposition to the fluid is removed by condensation at another area in the vessel. In another preferred embodiment the removal is effected by means of a fluid flowing through the vessel, for example when using an inert carrier gas. In this case the periodical deposition from, and the passage to, the fluid may be effected by a periodical change in the composition of the fluid.

Preferably a periodical variation in temperature is used.

The vessel preferably contains a supply of the crystal material at at least one further area where this material passes to the fluid. Preferably a temperature difference which periodically fluctuates between the area of the supply of crystal material and the area of deposition is used. Preferably in each period the mean temperature of one of these two kinds of areas is higher than that of the area or areas of the other kind, but during part of this period the temperature at the said area or areas of the other kind is higher than that at the area or areas of the first kind. If the deposition is effected exothermally, such as with sublimation and many chemical deposition reactions, the mean temperature of the supply area is thus chosen to be higher than that of the area of deposition, whereas in the latter preferred embodiment during each period the area of deposition is temporarily given a temperature higher than that of the supply area. If the deposition is enother- than that of the supply area. If the deposition is endother- is the case as regards the choice of the temperatures. It is thus rendered possible to use a vessel completely closed in which during the temporary transition of the crystal material from the area of deposition to the fluid, the removal of this material may be obtained by condensation at the supply area. The temperature variations may thus be chosen on the ground of the following formulas:

For the above-mentioned exothermal transitions one chooses:

$$\int_{t_b}^{t_e} T_v d\tau > \int_{t_b}^{t_e} T_a d\tau$$

and for the above-mentioned endothermal transitions one chooses:

$$\int_{t_b}^{t_e} T_v d\tau < \int_{t_b}^{t_e} T_a d\tau$$

where $T_v$ is the temperature at the supply area, $T_a$ is the temperature at the area of deposition, $t_b$ is the instant of the beginning of a period, $t_e$ is the instant of the end of this period, and $\tau$ is the period of time. If one chooses $T_v > T_a$ during part of the period and $T_v < T_a$ during another part of the period, this is effected in such manner that with the abovementioned exothermal transition the condition is fulfilled that $$\int_{\tau T_v > T_a} (T_v - T_a) d\tau > \int_{\tau T_v < T_a} (T_a - T_v) d\tau$$

and that the above-mentioned endothermal transition, the condition is fulfilled that $$\int_{\tau T_v > T_a} (T_v - T_a) d\tau < \int_{\tau T_v < T_a} (T_a - T_v) d\tau$$

where $$\int_{\tau T_v > T_a}$$

indicates the integration over the total part of a period in which $T_v > T_a$ and $$\int_{\tau T_v < T_a}$$

indicates the integration over the total part of the same period in which $T_v < T_a$.

It should be noted that a method has previously been suggested which envisages to grow larger crystallites at the expense of smaller ones by placing an amount of microcrystalline initial material in a sealed ampoule in an oven in which the temperature was periodically increased and decreased. By constantly evaporating and condensing it was envisaged locally to grow the larger crystallites at the expense of the smaller ones. Apart from the fact that in this method the amount of material after each period of increase and decrease in temperatture locally remained substantially unvaried, the evaporated material was not removed so that the amount of material evaporated and subsequently deposited was limited to the difference in saturation with vapour of the space in the ampoule not occupied by the crystal material at the two most extreme temperatures during each period of the temperature variation so that the process was comparatively poorly efficient.

Since, in the method according to the invention, supply and removal take place at the area of deposition, the deposition and the transition to the medium are not limited by attaining a state of saturation in the medium.

As regards the temperature differences in the last-mentioned preferred embodiment of the method according to the invention it should be noted that in certain cases where temperatures are chosen which no not satisfy the above described conditions, a varying deposition and then partial absorption by the fluid, giving a net deposit within each period, may in principle still be possible. These possibilities may be based on the fact that the rate of transfer need depend not only upon the temperature difference between supply area and deposition area, but also upon the mean temperature of these two areas. Further, when using a flow of fluid through the vessel by which the crystal material may be absorbed from the supply area and from which material may be deposited at the area of deposition, it is necessary to make allowance for the possibility that dilution phenomena may be caused by this current.

Another favourable aspect of the invention is the following. If a constant temperature difference is maintained in known manner between, for example, an evaporating supply of material at one area and a deposition on a seed crystal at another area, it is fundamentally possible to prevent the formation of new crystal nuclei. For this purpose, in general a certain minimum temperature difference is at least necessary, whilst the growth of crystals already present may take place also at a temperature difference which is smaller. However, said minimum temperature difference may be so small that a smaller temperature difference is difficult to obtain with an ordinary oven. In the method according to the invention it is possible when using such an oven in which an area of maximum temperature generally exists, to place the vessel alternately in a portion having a temperature gradient in one direction and in a portion having a temperature gradient in the opposite direction, for example for different periods of time. A similar process is also possible when using an oven which is so constructed that a temperature minimum exists between two maximum temperatures.

In a further preferred embodiment a mean temperature of deposition may be maintained in a central part of the vessel and end parts thereof may be given a mean temperature suitable for transition of the material to the fluid. The supply and removal of material through the fluid in such a case may be effected from more directions simultaneously. In an oven in which a constant field of temperatures is maintained with an area of minimum or maximum temperature, it is now possible to slide the central part of the vessel to and fro over this minimum or maximum, dependent upon whether the deposition of the crystal material is exothermal or endothermal. Alternatively it is possible to use an oven having portions which may be heated separately and in which the one and the other portion may alternately be given a higher temperature by switching over. If the two portions are relatively symmetrical and if, during equal periods, one portion is given a higher temperature and the other a lower temperature, and, subsequently, the other portion is given the same higher temperature and the first portion the said lower temperature, it is often found that the mean temperatures of the various areas in the oven, passing from the centre of one portion to the centre of the other portion, are not the same throughout but exhibit very small differences. Thus, for example, the average temperature at the transition between the two portions of the oven may be a little higher than at adjacent areas in the two parts of the oven. Such a small difference in temperature may also be stimulated, for example, by using resistance heating elements with wound heating wire in which the winding density close to the central tapping differs from that in the other portions. The temperature at the central area between the two portions of the oven will remain substantially constant if the left-hand and right-hand portions of the oven are given the same mean temperature. The central part of the vessel may now be placed centrally between the two parts of the oven. If the oven is such, or if steps are taken such, that the mean temperature in situ relative to the adjacent areas in the oven is favourable for deposition, it is possible to use a seed crystal in the central part and the initial material will be provided in the parts of the vessel located in the two parts of the oven. During the periodical changes in temperature of the two parts of the oven, there will be a continuous transport of material from one part of the oven to the other and vice versa. However, a comparatively constant crystal growth will take place in the central part but this uniform growth is limited to the very narrow region of minimum mean temperature, whereas directly adjacent thereto where the temperature fluctuates, any crystallites present or nuclei being formed disappear. In the presence of a seed crystal in the narrow central region it was found that in general no new crystal nuclei were formed at least in direct proximity to the seed crystal, whilst without the use of a seed crystal only one or few nuclei were formed and grew in this central zone. If it is desired to make the crystal progressively grow in the direction of the temperature gradient, the vessel may be caused to perform a reciprocating movement in the direction of the temperature gradient with the same period of the temperature variation so that the mean temperature gradient in the central region may be somewhat smoothed and deposition over a broader zone is thus rendered possible.

This broadening may be increased accordingly as the crystal has grown in the direction of the temperature gradient used in the oven.

With the types of an oven last described it is naturally also possible to transport material from the central part to the ends, it thus being possible locally to produce large crystals by crystal selection. A great many variations are possible for the shape of the vessel used. In general, and especially for the particular embodiments described hereinbefore, a tubular vessel is very suitable in which a temperature drop in the longitudinal direction of the vessel may be used.

It is also possible to use a broad rotation-symmetrical vessel the axis of which is at right angles to the temperature gradient used. By means of radial transport of material it is thus possible to obtain a comparatively intense transport between the axis and the periphery during which either a large crystal body may be formed comparatively rapidly on the axis of rotation and comparatively much initial material may be divided over the periphery, or a comparatively large number of relatively separated crystal bodies may be formed along the periphery from a supply of initial material placed at the centre.

Instead of changes of temperature in an oven, it is possible to use an oven with a constant field of temperature in which the vessel is rotated about a central axis which is at right angles to the direction of the temperature drop used. For this purpose, it is possible to use, for example, the above-mentioned tubular vessel which is rotated about an axis at right angles to the longitudinal direction. Preferably use is then made of the rotation-symmetrical vessel above described which is rotated about its axis, thus giving the advantages previously referred to.

If a rotary vessel is used the mean temperature of areas equidistant from the axis will be the same. The rotational speed determines the period in which the areas remote from the axis pass through a cycle of temperature variations. It will also be evident that, if the rotational speed is higher, the temperature variations of the areas farthest remote from the axis will decrease since the temperature of these areas cannot completely follow any more the temperature of the external field. According to a further aspect of the invention, it is now possible to rotate at least temporarily, so rapidly that all the areas in the vessel which describe the same circular paths during rotation simultaneously acquire substantially the same temperature. Although in this manner, as such, crystal selection cannot take place, the radial temperature gradient may be so small that new nuclear formation cannot occur any more. This temperature gradient can be so small because it is much smaller than the temperature gradient of the oven itself.

When using a rotary vessel it is possible to use a cylindrical oven positioned so that its axis has the same direction as the axis of rotation of the vessel. Preferably both axes are positioned vertically. If a vertical temperature gradient is present in the oven it may be utilized advantageously by positioning the vessel in the oven so that deposition on parts of the vessel located above the base is prevented and only a radial transport of material from one part of the bottom to another can take place. The radial temperature gradient may be obtained, if desired, by additional heating or cooling of the centre. When using a rotary vessel it is also possible to adjust a temperature drop extending from one peripheral part of the oven to another by means of one or more radiation screens arranged asymmetrically.

It will be evident that, when using periodical changes of temperature in the vessel, the initial material must be transported only in part during each period, so that these periods must not have an undue length. However, even comparatively long periods have been found to be usable. Further, the length of period and the local temperature variations may be varied at will during the process.

The above-mentioned methods may use a chemical means of transport by which the material or at least one of its constituents in the form of a chemical compound is transferred through the fluid to the area of deposition.

Further, it is possible, in addition to the periodical changes of temperature, for example, in addition to the periods of rotation upon quick rotation, to use additional periodical changes of temperature, for example in order to cause periodical changes of temperature upon crystallisation at an area normally maintained at a constant temperature and to obtain in situ crystal selection.

It is possible to produce one or several crystals at the area or areas of deposition, but it is alternatively possible previously to provide a seed crystal at the deposition area. In principle it is also possible to apply monocrystalline layers to bodies of compositions other than the crystal material.

The crystal material may be transferred by sublimation of at least one area of a higher average temperature to at least one other area of a lower average temperature. It is also possible to use a chemical transport reaction for the transfer.

The method may be used especially for the formation of crystals of semiconductor material. If desired, dopes may be deposited additionally by using such dopes in the initial material and/or in the fluid. More particularly the invention is applicable to semiconductor materials of the type $A^{II}B^{VI}$ or of the type $A^{III}B^{V}$, such as, for example gallium phosphide, but crystals of other semiconductor materials may also be used. Thus it is also possible to obtain crystals of cuprosulphide. It is further possible in principle to manufacture crystals of ferrites, for example $Fe_2O_3$, a great many materials in this class being used in view of their magnetic properties.

In order that the invention may be readily carried into effect, it will now be described more fully with reference to several examples and the accompanying diagrammatic drawings.

Figure 1:
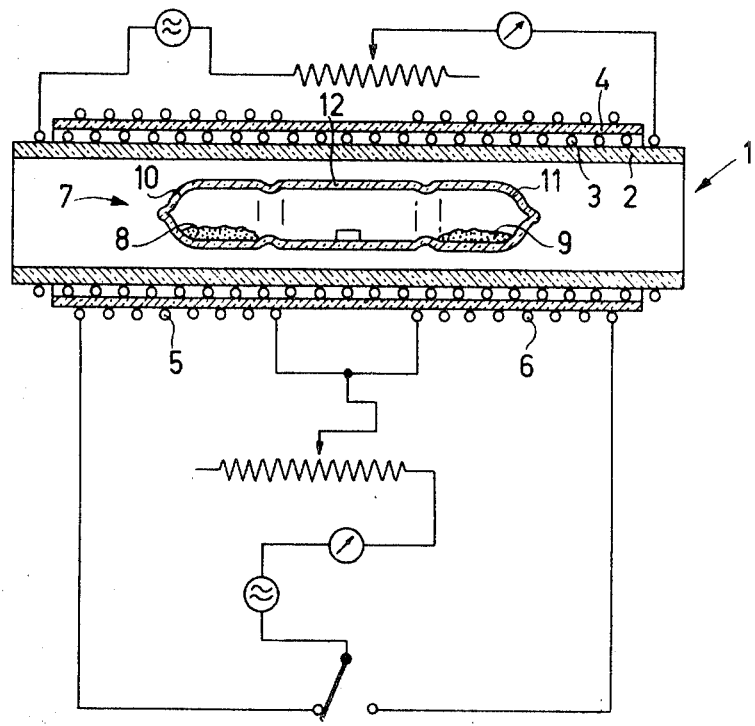
FIG. 1 shows, in vertical section, a device for the deposition of crystals which utilizes a tubular oven two parts of which may be heated alternately to a higher temperature and a lower temperature.
Figure 2:
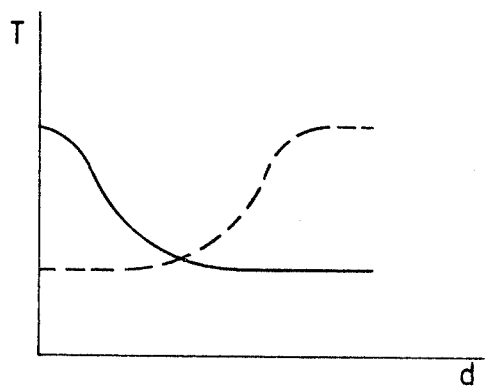
FIG. 2 shows instantaneous distributions of temperature along the longitudinal axis of the oven of FIG 1.

Referring now to FIG. 1, a cylindrical oven 1 comprises an inner cylindrical quartz envelope 2 having a heating wire 3 which is wound uniformly throughout its length and through which an adjustable current may be passed. The envelope 2 with resistance wire is surrounded by a second cylindrical quartz envelope 4 on which two separate windings 5 and 6 of similar resistance wire are wound with a small interspace, said windings likewise being wound uniformly and with the same pitch and further comprising equal numbers of turns. The two windings 5 and 6 are situated symmetrically relative to the centre of the oven and may be connected alternately to the same current source of adjustable strength. By energizing of the windings 3 and 5, a temperature drop over the central part of the oven is obtained, as shown by the curve drawn in full line in FIG. 2. The curve locally has a concave form. After switching-over from the winding 5 to the winding 6, the temperature inside the inoperative winding 5 will progressively decrease and the temperature inside the winding 6 will progressively increase until the temperature drop is obtained, as shown by the curve drawn in broken line in FIG. 2. The temperature at the centre of the oven remains constant as shown by the crossing of the two curves in FIG. 2.

A tubular ampoule 7 in which a supply of crystal material is divided in approximately equal portions 8 and 9 over two terminal parts 10 and 11, respectively, of the ampoule is now placed in the oven of FIG. 1. The crystal material and the fluid in the ampoule are such that transition from the crystal material to the fluid is effected endothermally and the deposition therefrom is effected exothermally. The ampoule is heated in the oven during which process the windings 5 and 6 are switched-on alternately for equal periods. The ampoule 7 is so positioned that its centre 12 coincides with the centre of the oven where the temperature remains substantially constant. In each period during one half of which the winding 5 and during the other half of which the winding 6 is switched on, the mean temperature of the centre 12 of the ampoule is lower than the mean temperature of the other parts of the vessel. However, now the temperature of the end part 11 is temporarily a minimum, then the temperature of the end part 10 is temporarily a minimum, so that each period material is transported from the terminal part 10 to the terminal part 11 and vice versa. It is found, however, that a slow uniform deposition now takes place over a small central region during which process only one or a few crystals are formed or a seed crystal already present is growing.

EXAMPLE I

In an ampoule of the type shown in FIG. 1 an amount of gallium phosphide in the form of small flakes having a total weight of 1.4 gms. is previously divided approximately equally over the two end parts 10 and 11. The ampoule is also filled with approximately 118 mgs. of bromine and then sealed. The ampoule has a length of approximately 15 cms. and an internal volume of approximately 20 ccs. The windings were energized, using periods of 30 minutes in which each of the windings 5 and 6 were energized for 15 minutes, so that maximum temperatures of approximately 1037° C. and minimum temperatures of approximately 992° C. were obtained at the two ends of the tube and the temperature at the centre 12 remained substantially constant at approximately 1010° C. Due to the presence of the bromine, the low volatile gallium was transferred by chemical transport, whereas the phosphorus was transferred in the form of phosphorus vapour and/or phophorus bromide. After 165 hours some gallium phosphide crystals had been formed at the centre 12, the largest crystal having a diameter of approximately 4 mms.

EXAMPLE II

In a similar manner as described in Example I, an ampoule of corresponding dimensions was previously filled with 150 mgs. of gallium phosphide in the form of small flakes likewise divided approximately equally over the two end parts, and approximately 20 mgs. of bromine, a seed crystal in the form of a wafer having a weight of 106.65 mgs. being placed at the centre 12. The period of temperature changes was now fixed to 20 minutes instead of 30 minutes. A maximum temperature of 946° C. and a minimum temperature of 926° C. were adjusted at the two ends, whereas a substantially constant temperature of 928° C. was obtained at the centre 12. After 7 hours the weight of the seed crystal was found to have increased by 14.25 mgs.

EXAMPLE III

In a similar manner as described in the Examples I and II, an ampoule having a length of approximately 14 cms. and a volume of approximately 14 ccs. was previously filled with 2.2 gms. of gallium phosphide in the form of small flakes, likewise provided approximately equally over the two end parts, and approximately 14.5 mgs. of deionized water. As is well-known, by means of the water vapour, gallium may be transferred by means of a chemical transport reaction. The period of temperature changes was adjusted to 30 minutes. A maximum temperature of approximately 1040° C. and a minimum temperature of approximately 987° C. were adjusted at the two ends, whereas a substantially constant temperature of approximately 1008° C. was obtained at the centre 12. After 880 hours two crystals of gallium phosphide had been formed at the centre, each having a weight higher than 200 mgs.

EXAMPLE IV

In a similar manner as described in the previous example an ampoule having a length of approximately 15 cms. and a volume of approximately 50 ccs. was previously filled with two grams of coarse-grained $Fe_2O_3$, likewise divided approximately equally over the two end parts, a seed crystal of 2 mgs. being placed at the centre 12, whereafter the tube was exhausted and then filled with hydrochloric acid gas at a pressure of approximately 35 mm. Hg at 20° C. The hydrochloric acid serves to transfer the iron by means of a chemical transport reaction. The centre 12 of the tube was again positioned at the centre of the oven. The period of temperature changes was now adjusted to 7 hours. A maximum temperature of 673° C. and a minimum temperature of 611° C. were adjusted at the two ends of the ampoule, whereas a substantially constant temperature of 626° C. was obtained at the centre 12. After 800 hours the seed crystal was found to have grown into a crystal having a weight of 260 mgs.

Figure 3:
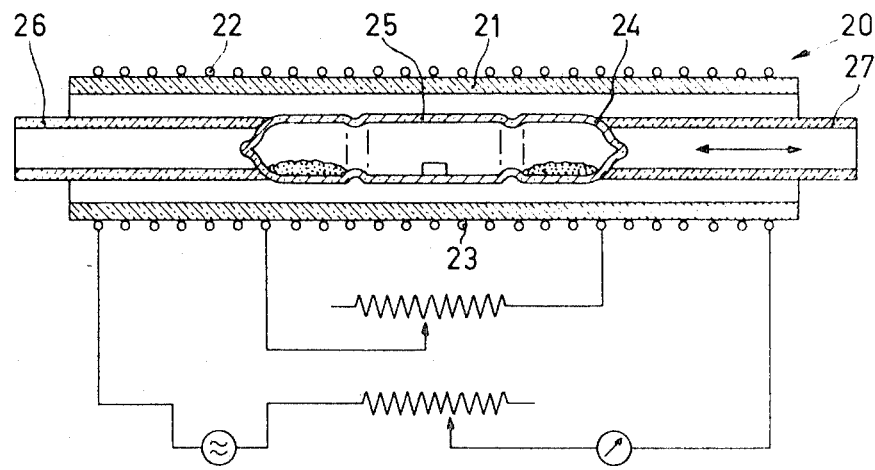
FIG. 3 shows, in vertical section, another device for the deposition of crystals in which the vessel can be moved to and fro in a tubular oven in the longitudinal direction of the oven.
Figure 4:
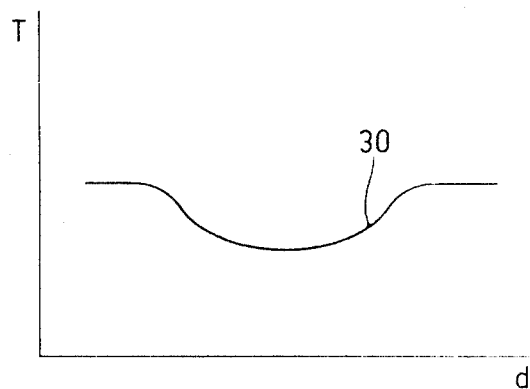
FIG. 4 shows the division of temperature prevailing in the oven of FIG. 3 in the longitudinal direction thereof.

FIG. 3 shows an oven 20 in which a quartz tube 21 has wound on it a heating wire 22 in a central part 23 of which the current strength may be decreased in an adjustable manner. A temperature variation may thus be obtained inside this central part which is of a kind as shown by curve 30 in FIG. 4. A filled ampoule 24 of the type described with reference to FIG. 1 is placed with its centre 25 in the middle of the oven by means of two tubular graphite holders 26 and 27. These two holders may in common be moved to and fro by means of a mechanism not shown. The temperatures in the oven are now maintained constant during the treatment and, during each period, the ampoule performs a reciprocating movement by means of the holders 26 and 27, the centre 25 equally deviating to the left and to the right of the centre of the oven. In this case also the mean temperature of the centre 12 during each period is lower than the mean temperatures of the other parts of the vessel. If the crystal material and the fluid in the vessel are such that exothermal deposition takes place, one or more crystals may be formed or grow at the centre if initial materials 28 and 29 are provided at the ends of the tube. In this case the centre 25 experiences a small fluctuation in temperature.

EXAMPLE V

Gallium phosphide crystals were formed in the manner as described above with reference to FIG. 3. The ampoule used had a length of approximately 15 cms. and a volume of approximately 20 ccs. The ampoule had previously been filled with 1 gm. of gallium phosphide in the form of small flakes, divided in approximately equal parts over the two ends of the tube. The ampoule also contained 13 mgs. of deionized water. The ampoule was placed between the two holders 26 and 27 with its centre 25 centrally in the oven and moved to and fro in periods of 30 minutes, the two ends of the ampoule acquiring a maximum temperature of approximately 1045° C. and a minimum temperature of approximately 1025° C. and the centre 25 a maximum temperature of approximately 1037° C. and a minimum temperature of approximately 1025° C. After 283 hours a number of bipyramidal gallium phosphide crystals had grown, separated from one another, in the central part of the vessel.

EXAMPLE VI

The method adopted was similar to that described in Example V. In this case the amopule which had a length of 15 cms. and a volume of 30 ccs. was previously filled with 1 gm. of coarse-grained $Fe_2O_3$, equally divided over the two end parts of the amopule, a seed crystal of approximately 0.5 mg. at the centre 25 and hydrochloric acid gas at a pressure of approximately 142 mm. Hg at 20° C. The period of displacement used was 30 minutes. The maximum and minimum temperatures of the two ends of the ampoule were 726° C. and 690° C. respectively. The maximum and minimum temperatures of the centre 25 were 693° C. and 655° C. respectively. After 670 hours the seed crystal had grown into a crystal having a weight of 92 mgs.

It should be noted that in FIG. 3 the ends of the ampoule extend beyond the part 23 of the winding of heating wire 22. However, the dimensions may be chosen to be such that the ampoule is shorter than the length of the winding part 23.

Figure 5:
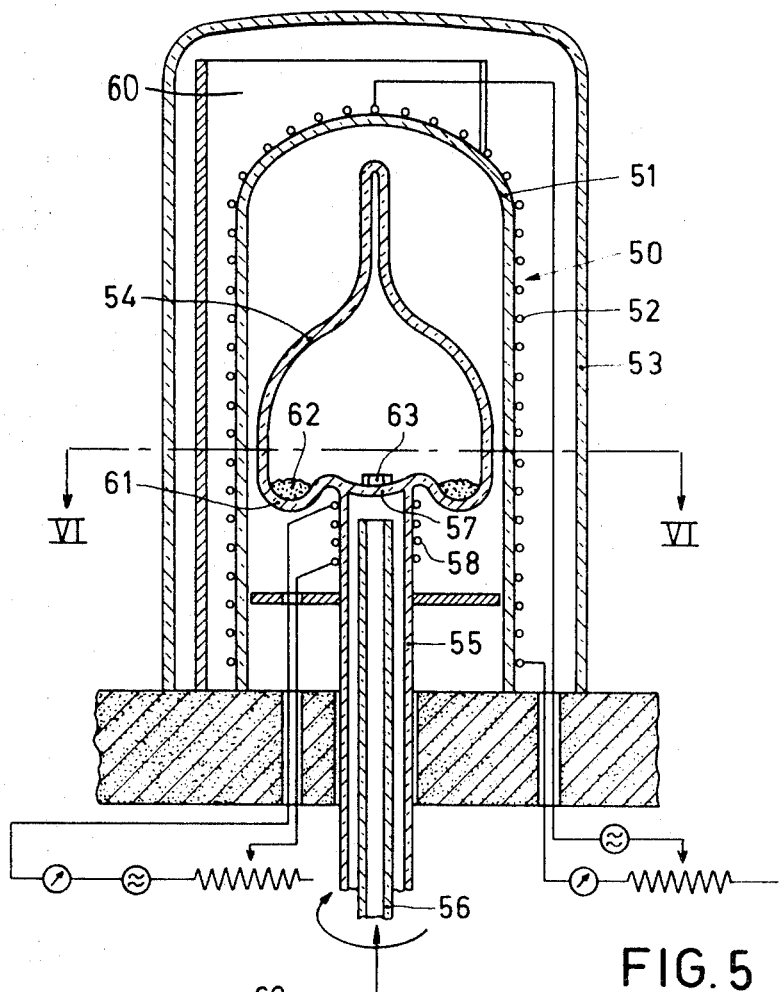
FIG. 5 shows, in vertical section, a device for the deposition of crystals in a rotation-symmetrical vessel having a vertical axis.
Figure 6:
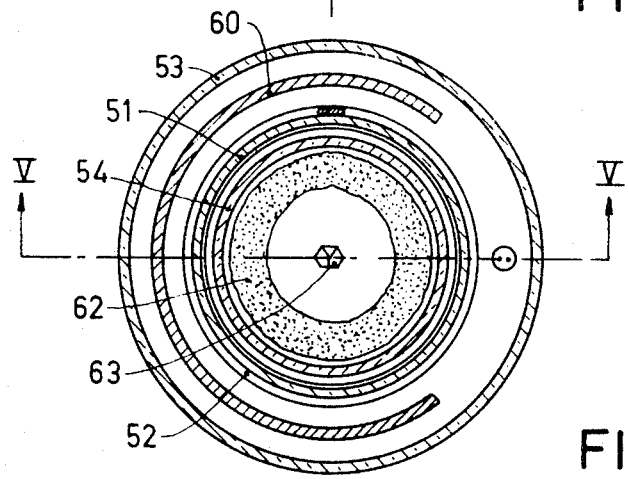
FIG. 6 shows the device of FIG. 5 in horizontal section along the line VI—VI of FIG. 5.

FIGS. 5 and 6 show an oven 50 comprising a cylindrical quartz envelope 51 sealed above by a dome-shaped part, the oven being placed with its axis in a vertical position and having a heating wire 52 wound on it up to the upper side of its dome-shaped part 51. The oven 50 is surrounded by a glass receptacle 53 which decreases external cooling of the oven by convection. Within the oven a rotation-symmetrical sealed vessel 54 is arranged with its axis in a vertical position and co-axially of the oven 50. The vessel 54 is placed co-axially on a vertical quartz tube 55 connected to a mechanism (not shown) by means of which the tube and the vessel may be rotated at an adjustable speed of rotation. The tube 55 houses a second tube 56 through which cold air may be blown against the centre 57 of the bottom of the vessel 54. Further the upper end of the tube 55 is surrounded by a heating wire 58 by means of which additional heat may be supplied to the centre 57 of the bottom. A horizontal radiation screen 59 is arranged within the envelope 51 of the oven and below the heating wire 58. Another radiation screen 60 which surrounds the oven only in part, may be placed between the oven 50 and the glass recipient 53 so that a horizontal temperature gradient may be obtained between the non-shielded side and the opposing side of the oven. However, it is also possible to omit the radiation screen 60 and cover the surface of the receptacle 53 with the reflective metal layer, for example, an evaporation-deposited gold layer, and to adjust a radial temperature gradient by regulating the temperature at the centre 57 of the bottom of the vessel. By means of a suitable fluid it is now possible to transfer crystal material in the vessel 54 from an initial supply 62 provided along the periphery 61 to the centre of the base 57 for the formation or growth of a crystal 63. The examples following hereinafter relate to exothermal depositions of crystal material. Since the wound heating wire 52 also extends over the sealed upper part of the envelope 51 of the oven, a vertical temperature gradient is also obtained so that the temperature increases upwardly, resulting in transport of material only from one part of the bottom to another part of the bottom. If the deposition were endothermal it is possible, for example, to tap the wire 52 at the upper end of the cylindrical part of the oven so that the dome-shaped upper part is not heated and the temperature decreases in the upward direction.

By means of the air flow through the tube 56 and the heating element 58, the temperature of the centre 57 of the bottom may be adjusted to a given value by means of a thermo-element not shown, the connection wire 58 being switched on and off in a similar manner as in a thermo state if the temperature of the centre 57 of the bottom either drops below or exceeds the desired value.

With this device crystals were formed and grown in different ways. Thus, with the use of the screen 60 and a slowly-rotating vessel containing cuprosulphide mixed with sulphur, divided along the periphery, and HBr vapour for transport, wherein along the periphery the maximum temperature was 445° C. and the minimum temperature was 420° C., three plate-shaped cuprosulphide crystals were formed at the centre 57 where a temperature of 430° C. was adjusted, the largest of these crystals having a diameter of approximately 1 cm.

Further, with the use of the screen 60, a seed crystal of $Fe_2O_3$ was grown from 5 mgs. to 50 mgs. at the centre 57 of the bottom, the initial material (2 gms.) being divided over the periphery 61 and the vessel being filled with hydrochloric acid gas at a pressure of approximately 56 mm. Hg at 20° C. The period of rotation was 10 minutes per revolution. For three days maximum and minimum temperatures of 485° C. and 464° C. respectively were adjusted along the periphery, and for the subsequent 17 days minimum and maximum temperatures of 540° C. and 566° C. respectively were adjusted.

Further, with the use of the screen 60, some $Fe_2O_3$-crystals divided over the periphery were grown further from 0.235 gm. of $Fe_2O_3$ grains provided at the centre of the bottom. The vessel has previously been filled with hydrochloric acid gas at a pressure of approximately 100 mm. Hg at 20° C. The rotational speed of the vessel was again 1 revolution in 10 minutes. Along the periphery the maximum temperature was 650° C. and the minimum temperature was 593° C., whereas the centre of the bottom was heated to a constant temperature of 632° C. The duration of the treatment was 24 days.

In a different process a radial temperature drop was adjusted in the oven. The screen 60 was then omitted and the receptacle 53 was covered with a reflective evaporated gold layer. The temperature along the periphery 61 of the vessel was substantially the same throughout so that rotation was not required. The temperature of the periphery was increased and decreased by periodical variation of the current strength in the wire 52, the temperature of the centre 57 of the bottom being maintained constant in the manner previously described. Thus in a vessel 54 having a volume of 34 ccs. in which 1.1 gs. of $Fe_2O_3$ grains were equally divided over the periphery 61 and in which an $Fe_2O_3$ seed crystal of 18.1 mgs. was provided at the centre 63 of the bottom, which vessel was further filled with hydrochloric acid gas at a pressure of approximately 134 mm. Hg at 20° C., the temperature of the periphery 61 was varied between a maximum of 702° C. and a minimum of 667° C., whereas the seed crystal was maintained at a constant temperature of approximately 667° C. After 27 days the seed crystal had grown into a crystal having a weight of 150 mgs.

In the embodiments described herein by way of example, the depositions invariably were exothermal. It will be evident that endothermal depositions may also be used with corresponding matching of the equipment described. For example, tin dioxide in the presence of hydrobromic acid vapour may be transferred by a chemical transport reaction, the deposition then being endothermal.

It is also possible to use a liquid solvent as the fluid.

Thus, for example, in an H-shaped vessel containing an amount of fine-grained aluminium-ammonium-alum on the bottoms of the two limbs, which vessel was further filled with a saturated aqueous of aluminium-ammonium-alum crystals of approximately 1 cm. in diameter were formed in the tubular horizontal central part of the vessel by alternating heating the two limbs.

As in general crystallic materials soluble in a suitable solvent have different saturation concentrations in such a solvent at different temperatures, the invention is suitable for producing crystals of a large variety of compositions known to be soluble in suitable liquids, for instance a large variety of organic crystalline materials soluble in known organic liquids, such as different alcohols, acetone, benzene, toluene, and many others known as such.

What is claimed is:

1. A method of manufacturing crystals in a vessel from at least one supply area of polycrystalline material located in an area in said vessel, comprising causing a fluid to remove a part of the material from at least one supply area of polycrystalline material, providing a cyclic temperature differential between a supply area of the polycrystalline material and a deposition area in said vessel removed from said supply area of polycrystalline material, the temperature differential at the first half of said cycle being sufficient to cause material to be deposited from said fluid at said deposition area, the temperature differential at the second half of said cycle being the reverse of the temperature differential at the first half of the cycle but of a degree such that a portion, but not all, of the material deposited at the deposition area during the first half of the cycle is removed by the fluid thereby depositing a net amount of material at said deposition area during said cycle and repeating said cycle for a sufficient number of times to cause large crystals to grow at said deposition area while preventing the growth of small crystals at said deposition area.

2. The method of claim 1 wherein at least two supply areas of polycrystalline material are provided, the mean temperature of said supply area differs from that of the deposition area and during part of the cycle the temperature at one of said supply areas is higher than that of another supply area.

3. The method of claim 2 wherein the vessel is placed inside an oven in which a temperature gradient is maintained and the vessel undergoes a reciprocating movement in the direction of the temperature gradient.

4. The method of claim 3 wherein the period of the reciprocating movement of the vessel corresponds to a period in which the local temperatures in the oven have passed through one temperature cycle.

5. The method of claim 4 wherein the distance through which the vessel is moved progressively increases during te succeeding periods as the crystal in the central part grows in the direction of displacement.

6. The method of claim 1 wherein an axially symmetrical vessel is employed and is rotated about an axis at right angles to the direction of a temperature gradient in an oven.

7. The method of claim 1 wherein the crystal material is transferred by sublimation.

8. The method of claim 1 wherein the crystal material undergoes a chemical reaction with the fluid.

9. The method of claim 1 wherein a seed crystal is provided at the area of deposition.

10. A method of producing crystals in a sealed vessel by deposition of material from a fluid contained in said vessel, said vessel being positioned in a tubular furnace provided with first alternatively operated heaters on either end of the furnace and a space therebetween and a second additional adjustable heater extending substantially the full extent of the furnace, said sealed vessel containing a supply of material to be crystallized at the terminal ends thereof with an intervening deposition area, the respective supplies of material being located respectively adjacent the alternatively operated heaters, comprising energizing the first heater windings alternatively in the areas where the supply of material is located to cause a maximum temperature to exist in those areas and to effect vaporization of the supply material, maintaining the deposition area at a relatively lower temperature such that sublimation will occur to deposit crystalline material in said area, energizing the second heater windings while the first heater is energized to vaporize the undersized crystals in the deposition area and then de-energizing the second heater to redeposit the vapor at the deposition area to produce a net increase in crystal size.

References Cited
UNITED STATES PATENTS

| | | | |
|---|---|---|---|
| 3,019,092 | 1/1962 | Rosi et al. | 23—294 |
| 3,210,149 | 10/1965 | Eland | 23—294 |
| 3,362,795 | 1/1968 | Weisbeck | 23—294 |
| 3,249,473 | 5/1966 | Holonyak, Jr. | 148—175 |
| 3,243,267 | 3/1966 | Piper | 23—294 |

NORMAN YUDKOFF, Primary Examiner

C. P. RIBANDO, Assistant Examiner

U.S. Cl. X.R.

23—295